June 5, 1934.   C. W. WOOD   1,961,809
TRANSMISSION
Filed Aug. 15, 1933   2 Sheets-Sheet 2

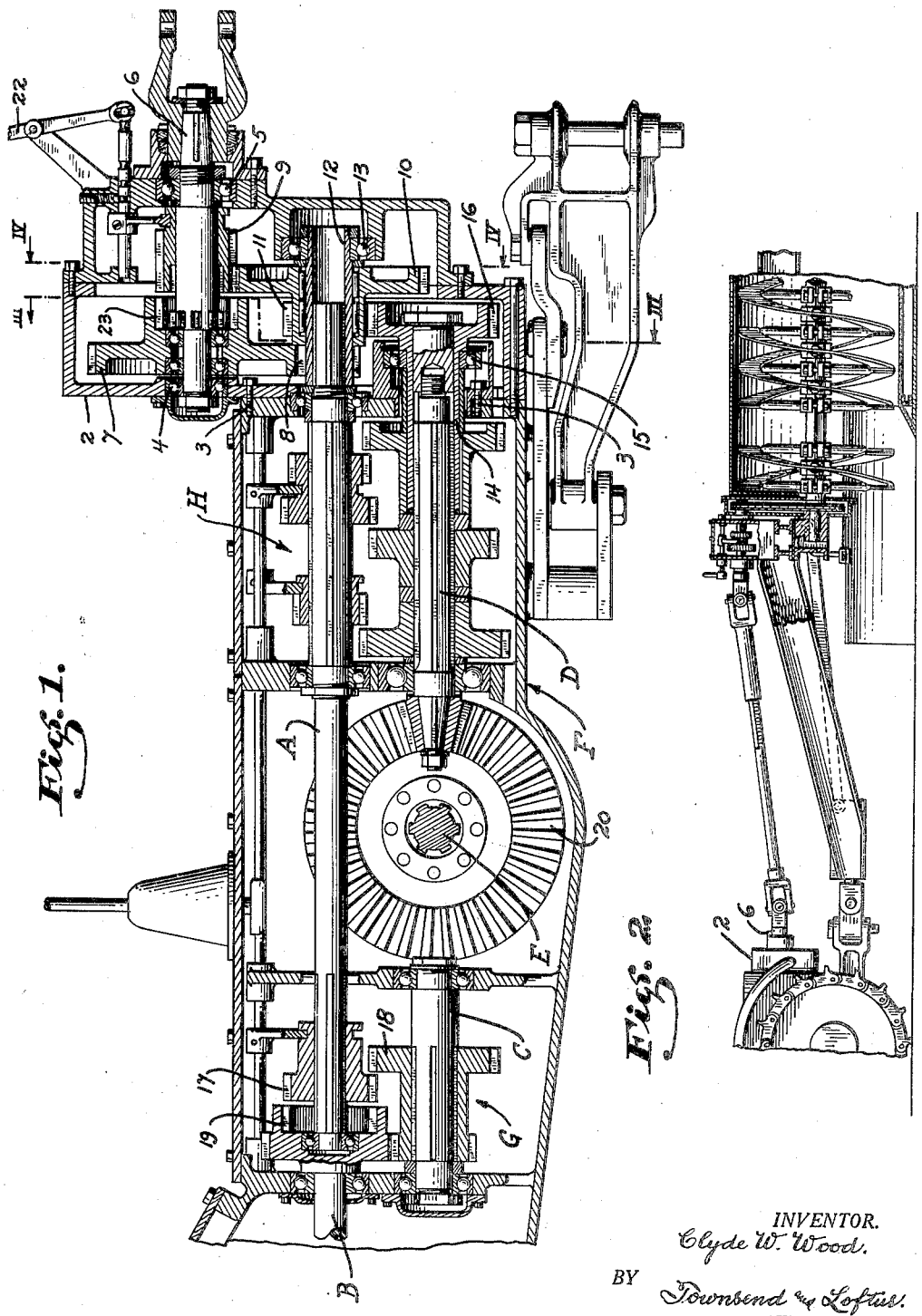

INVENTOR.
Clyde W. Wood.
BY Townsend and Loftus.
ATTORNEYS.

Patented June 5, 1934

1,961,809

UNITED STATES PATENT OFFICE 1,961,809

TRANSMISSION

Clyde W. Wood, Stockton, Calif.

Application August 15, 1933, Serial No. 685,206

3 Claims. (Cl. 74—57)

This invention relates to a selective gear transmission such as used in track type tractors and the like, and especially to a combination transmission and power take-off in which the power take-off and countershaft may be driven through an auxiliary set of reduction gears.

Track type tractors are employed for numerous purposes but usually for hauling heavy portable machinery, such as gang-plows, scrapers, scarifiers, graders, etc., at comparatively low speeds. Lately tractors of this type have been employed, not only for hauling machinery of this character, but also for transmitting power thereto, see for instance my copending application entitled "Machine for mixing road material", filed July 3, 1933, Serial Number 678,913. The machine there disclosed is hauled by a tractor over a road to be surfaced and as the machine advances material is gathered and delivered to a mixing cylinder where it is mixed with oil, asphalt, or like binder, and then discharged at the rear of the machine where it is leveled off and compacted to form a finished road surface. Road material mixing machines of this character are usually provided with a gas engine or like power unit to furnish power to drive the mixer and other mechanism cooperating therewith, and the tractor serves only one function, to-wit, that of hauling the machine. This arrangement is not very satisfactory as it materially increases the weight of the machine and complicates the entire mechanism, that is, there will be the additional weight of the gas engine itself, the fuel tank, power transmission shafts, bearings, clutches, etc. By driving the mixer from the power take-off shaft on the tractor the gas engine, the fuel tank, transmission shafts, bearings, clutches, etc., may be entirely eliminated thereby simplifying the construction of the mixer, reducing weight, and materially decreasing cost.

A track type tractor of the type required usually has a speed range of two to six miles per hour. Such speeds are desirable for many purposes but are entirely too great for hauling the type of road material mixing machine disclosed in my copending application, as that machine is designed to be hauled, or to be advanced over a road surface, at a speed ranging from one-quarter to one-half mile per hour; also the rotating parts of the mixer such as the mixing paddles, the helical conveyor, etc., must not exceed a certain speed as the material to be mixed will pass through too rapidly and will be centrifugally thrown out.
In view of the fact that the tractor must travel at a speed as low as one-quarter of a mile per hour, it is obvious that a special transmission with a sufficiently low gear ratio for this purpose might be designed but such a transmission would be impractical for the higher speeds, for instance four to six miles per hour when the tractor is used for other purposes. That is, a tractor of this character to be practical should be able to operate at the normal speed range from two to six miles per hour so that it may be used for general work and for moving the road material mixing machine from one location to another, and it should then be possible to lower the gear ratio so that the desired low speed from one-quarter to one-half mile may be maintained when the mixer is in operation.

The present invention embodies an auxiliary reduction gear transmission which may be attached to a standard form of selective gear transmission such as used on track type tractors of the character described, said auxiliary transmission being capable of being disconnected and inoperative and permitting the usual operation of the standard transmission when the tractor is driven at normal speeds, and being capable of being connected with the main shaft of the standard transmission and to function as a reduction gear drive between the main shaft and the countershaft when the tractor is to be driven at low speed, said auxiliary transmission also carrying a power take-off shaft which is adapted to be driven from the main shaft of the standard transmission at a reduced speed.

The transmission is shown by way of illustration in the accompanying drawings, in which—

Fig. 1 is a central, vertical longitudinal section of the transmission.

Fig. 2 is a side elevation showing the rear end of a track type tractor and the forward end of a road material mixing machine, said view showing the manner in which the drawbar is connected with the tractor and said view also showing the manner in which power is transmitted from the power take-off shaft on the tractor to drive the mixing mechanism on the machine being hauled.

Figure 4:
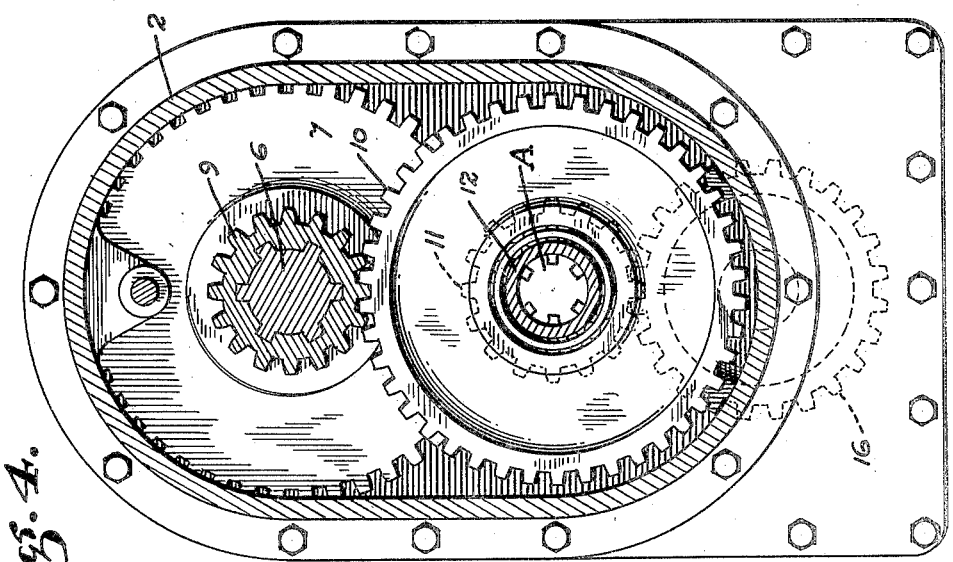
Fig. 4 is an enlarged cross section taken on line IV—IV of Fig. 1.
Figure 3:
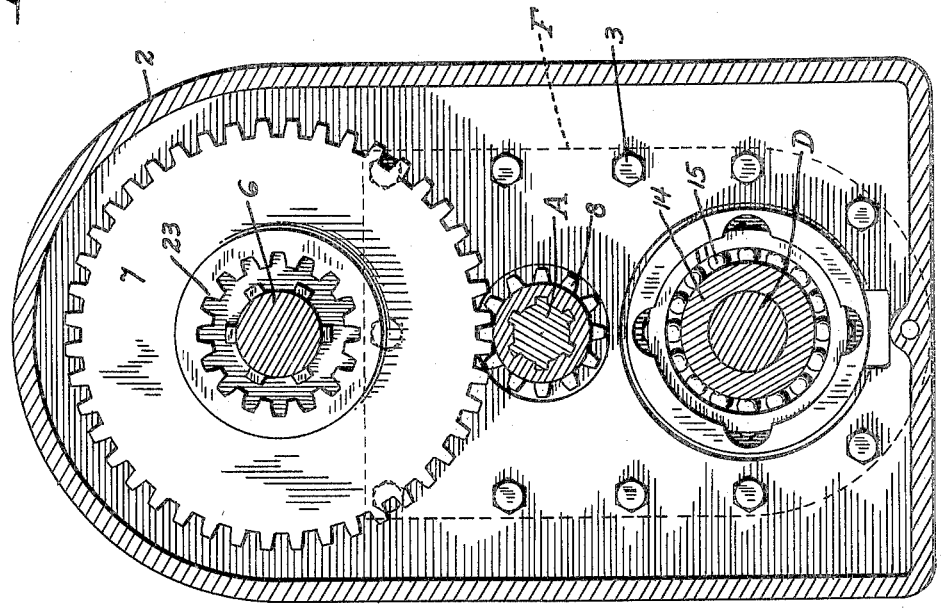
Fig. 3 is an enlarged cross section taken on line III—III of Fig. 1.

Referring to the drawings in detail, A indicates the upper or main shaft of a selective sliding gear transmission; B the master clutch or drive shaft; C the first countershaft; D the second counter shaft; and E the cross shaft which carries the usual steering clutches through which power is transmitted to drive the respective tracks of a track type tractor. The several shafts are suitably journaled in the transmission housing, as shown at F, and selective sliding gears are employed to drive the tractor at various speeds. The selective sliding gears are divided into two groups, generally indicated at G and H, and are actuated by gear shift levers in the usual manner.

The transmission so far described is of standard construction and of the type employed in track type tractors. With this transmission speeds ranging from two to six miles per hour are obtainable but, as previously stated, such speeds are entirely too high when the tractor is employed for the purpose of hauling the road material mixing machine previously referred to.

The desired or required speed reduction is obtained in the present instance by employing an auxiliary reduction gear transmission enclosed in a housing 2, this housing being bolted as at 3 to the end of the housing F. Supported in bearings 4 and 5 in the upper portion of the housing is a power take-off shaft 6. Freely rotatable on said shaft is a gear 7 which intermeshes with a drive pinion 8, and splined on shaft 6 and slidable longitudinally thereon is a gear 9 which intermeshes with a gear 10. Gear 10 and a cooperating gear 11 are secured on a common hub member to rotate as a unit, and they are freely rotatable on the sleeve shaft 12, which will hereinafter be referred to as the intermediate shaft. This shaft is supported at one end on an extension of the upper main shaft A, and the outer end is supported in the bearing 13. The sleeve or intermediate shaft is splined or otherwise secured to the extension of the upper main shaft A, and gear 8 is, in turn, secured to the intermediate shaft so that power may be transmitted directly from the upper main shaft A through the gear or pinion 8 to drive the gear 7. Rotation of the intermediate shaft, however, has no effect on the intermediate gears 10 and 11, as they are mounted to freely rotate with relation to said shaft.

The second counter shaft, indicated at D, is also provided with a sleeve shaft, such as indicated at 14; the inner end of the sleeve being supported by the end of the counter shaft D and the outer end being supported in a bearing 15. The sleeve shaft 14 forms the counter shaft of the auxiliary transmission and is keyed or splined to the second counter shaft D and forms an extension thereof. The sleeve shaft or counter shaft 14 carries a gear 16 and this intermeshes with the intermediate gear 11.

In actual operation with all gears assuming the position shown in Fig. 1, the transmission as a whole will be neutral and no power will be transmitted. If the tractor is to be employed for ordinary hauling and the higher speeds from two to six miles per hour are desired, the desired sliding gear, shown in group H, may be thrown into mesh with the cooperating gear shown on the second counter shaft D; also, the sliding gear 17 of group G will be moved into mesh with either the gear 18 or the clutch 19. If clutch 19 is meshed, power will be directly transmitted from the clutch or main drive shaft B to the counter shaft and then through the intermeshing gears in group H to the second counter shaft and finally through the intermeshing bevel gears indicated at 20 to the cross shaft E which, in turn, transmits power through the steering clutch to the respective drive tracks. If a higher speed is desired, gear 17 of group G may be meshed with gear 18.

If the tractor is to be employed for the purpose of hauling the road material mixing machine previously referred to, the sliding gears shown in group H will be moved to neutral position and gear 17 will be meshed with clutch 19; gear 9 in the auxiliary transmission will then be moved by means of a shifting lever 22 to intermesh with a clutch 23 on gear 7. Power will then be transmitted from shaft B to shaft A, and as this drives the intermediate shaft 12 and the driving pinion 8 secured thereon, power will be transmitted to drive the gear 7, and through clutch 23 power will at the same time be transmitted to drive the power take-off shaft 6, and as gear 9 is splined thereto, power will further be transmitted through the intermediate gears 10 and 11 to drive the gear 16, and as this is secured on the sleeve shaft 14 which is splined to the second counter shaft, power will be transmitted to drive the counter shaft, the gears 20 and the cross shaft E.

By transmitting the power through the several gears just described, it will be noted that a considerable reduction is obtained, as there is a reduction between the gears 8 and 7, there is similarly reduction between the gears 9 and 10, and the gears 11 and 16. In this position of the gears and clutches a speed of one-quarter mile an hour will be obtained, but by shifting gear 17 to mesh with gear 18 in group G, the speed will be doubled and as such will reach the maximum low speed, to-wit, one-half mile per hour.

From the foregoing it will be noted that a standard transmission is employed which may be operated in the usual manner to drive the tractor at its normal speed from two to six miles an hour. With such speeds the tractor may be employed for any and all purposes. On the other hand, if it is desired to employ the tractor for hauling the road material mixing machine, gears H of the standard transmission may be moved to neutral position and by engaging either the clutch 19 or the gear 18 of group G, power may be transmitted through clutch 23 to drive not only the power take-off shaft 6 but also the second counter shaft at a very materially reduced speed. It is thus possible to haul the road material mixing machine at the required speed, and it is also possible to transmit power from the power take-off shaft on the tractor to the mixing mechanism on the road material mixing machine at the proper speed.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. The combination with a selective gear transmission having a main, a counter and a cross shaft driven from the counter shaft, of an auxiliary transmission having a power take-off shaft, an intermediate and a counter shaft, said counter shaft having a driving connection with the first-named counter shaft, reduction gears transmitting power from the main to the power take-off shaft, reduction gears transmitting power from the power take-off shaft through the intermediate and counter shaft of the auxiliary gear transmission to the counter shaft of the first-named transmission, and selective means for connecting or disconnecting a drive between said last-named reduction gears and the first-named reduction gears.

2. The combination with a selective gear transmission having a main, a counter and a cross shaft driven from the counter shaft, of an auxiliary transmission having an intermediate shaft direct connected and driven by the main shaft of the first-named transmission, a power take-off shaft and a counter shaft in the auxiliary transmission, a gear on the intermediate shaft for transmitting power to the take-off shaft, a pair of freely rotatable gears on the intermediate shaft, a gear on the counter shaft with which one of said gears intermeshes, clutch means for connecting or disconnecting a drive through the power take-off shaft to the intermediate gears, and a direct connection between the counter shaft of the auxiliary transmission and the counter shaft in the first-named transmission.

3. The combination with a selective gear transmission having a main, a counter and a cross shaft driven by the counter shaft, of an auxiliary transmission disposed at one end of the main and counter shaft of the first-named transmission, said auxiliary transmission having a power take-off shaft, an intermediate shaft and a counter shaft, said intermediate shaft being direct connected with the main shaft of the first-named transmission and the counter shaft of the auxiliary transmission being direct connected with the counter shaft of the first-named transmission, a driving pinion fixed on the intermediate shaft and meshing with a freely rotatable gear mounted on the power take-off shaft, a second gear on the power take-off shaft and splined to rotate therewith, clutch means for connecting said gear with the freely rotatable gear on the power take-off shaft, a gear secured to the counter shaft of the auxiliary transmission, and a pair of intermediate gears freely rotatable on the intermediate shaft and intermeshing with the splined gear on the power take-off shaft and with the gear on the counter shaft of the auxiliary transmission.

CLYDE W. WOOD.